(12) United States Patent
Esser et al.

(10) Patent No.: US 8,180,616 B1
(45) Date of Patent: May 15, 2012

(54) COMPONENT TRACING IN A NETWORK PACKET PROCESSING DEVICE

(75) Inventors: Robert Peter Esser, Los Gatos, CA (US); Lionel Edward Barker, Stillorgan (IE)

(73) Assignee: Xilinx, Inc., San Jose, CA (US)

( * ) Notice: Subject to any disclaimer, the term of this patent is extended or adjusted under 35 U.S.C. 154(b) by 811 days.

(21) Appl. No.: 12/337,901

(22) Filed: Dec. 18, 2008

(51) Int. Cl.
G06F 17/50 (2006.01)
G06G 7/62 (2006.01)

(52) U.S. Cl. .......................................... 703/13; 709/224
(58) Field of Classification Search ...................... 703/13
See application file for complete search history.

(56) References Cited

U.S. PATENT DOCUMENTS

| | | | | |
|---|---|---|---|---|
| 4,128,882 A | * | 12/1978 | Dennis | 711/117 |
| 6,873,600 B1 | * | 3/2005 | Duffield et al. | 370/252 |
| 6,965,566 B2 | | 11/2005 | Kawasaki et al. | |
| 7,197,553 B2 | * | 3/2007 | Roberts et al. | 709/223 |
| 7,636,908 B1 | * | 12/2009 | Brebner | 716/102 |
| 7,831,711 B2 | * | 11/2010 | Cranor et al. | 709/224 |
| 7,979,818 B1 | | 7/2011 | Esser et al. | |

OTHER PUBLICATIONS

Ulfers, Horst, "PACKSIM, A Personal Computer Implementation of a Packet Switched Network Simulation Model", Proceedings of the 1986 Winter Simulation Conference, pp. 769-775, 1986.*

Attig et al, "Systematic Characterization of Programmable Packet Processing Pipelines", 14th Annual Symposium on Field-Programmable Custom Computing Machines, 2006.*

Duffield et al, Trajectory Sampling for Direct Traffic Observation, SIGCOMM'00, 2000.*

Soviani et al, "Synthesis of High-Performance Packet Processing Pipelines", DAC 2006.*

* cited by examiner

Primary Examiner — Mary C Jacob
(74) Attorney, Agent, or Firm — LeRoy D. Maunu (57) ABSTRACT

Approaches for gathering packet processing information. A directed graph is used to represent the packet processing system. In response to each network packet input to the system, an associated, unique packet identifier is established for the network packet. Each input network packet is processed by one or more components of the system. For each input network packet, respective log data is stored by each of one or more components of the system that processed the input network packet. The log data includes data from the input network packet, and the associated identifier. Components of the device that processed a packet having a selected, associated packet identifier are determined by traversing the graph and searching for graph-connected nodes for which the represented components stored log data with the selected packet identifier. Data is output indicating the components that processed the packet having the selected packet identifier.

16 Claims, 5 Drawing Sheets

COMPONENT TRACING IN A NETWORK PACKET PROCESSING DEVICE

FIELD OF THE INVENTION

The present invention generally relates to tracing the processing of packets by components in a network packet processing device.

BACKGROUND

A network device, for example, a router, firewall, bridge, etc., includes a number of interconnected components for processing packets. Each component has some number of input and output ports over which packets are received and sent. Each packet input to a component is processed by that component and then forwarded to one or more other components in the device.

In testing a design for a device that is built for a particular communication protocol, the effort generally involves preparing and inputting packets to a simulation of the design, capturing packets that are output from the simulation, and determining whether or not the output packets are correct. Due to the complexity and numerous combinations of possible component interactions, verifying the behavior of internal components and diagnosing problems may be difficult for a developer. The path through which a packet flows through a system may vary in response to the state of the system or the values of certain fields in the packet. In addition, creating individual test stimuli for internal components can be difficult for a developer.

The present invention may address one or more of the above issues.

SUMMARY

Various embodiments are disclosed for gathering packet processing information in a packet processing system having a plurality of components. In one embodiment, a method represents a directed graph of the network packet processing system in a memory. Nodes of the graph represent respective components, and arcs between the nodes represent packet connections between the components of the packet processing system. In response to each network packet input to the system, an associated, unique packet identifier is established for the network packet. Each input network packet is processed by one or more components of the system. Respective log data is stored by each of the one or more components of the system that processes each input network packet. The log data includes data from the input network packet and the associated identifier. Components of the device that processed a packet having a selected, associated packet identifier are determined by traversing the graph and searching for graph-connected nodes for which the represented components stored log data with the selected packet identifier. Data indicating the components that processed the packet having the selected packet identifier is output.

In another embodiment, an article of manufacture comprises a processor-readable storage medium configured with instructions for gathering packet processing information in a simulated packet processing system having a plurality of components. The instructions, when executed, cause one or more processors to perform the operations including representing, in a memory, a directed graph of the network packet processing system. Nodes of the graph represent respective components, and arcs between the nodes represent packet connections between the components of the packet processing system. In response to each network packet input to the system, an associated, unique packet identifier is established for the network packet. Each input network packet is processed by one or more components of the system. Respective log data is stored by each of the one or more components of the system that processes each input network packet. The log data includes data from the input network packet and the associated identifier. Components of the device that processed a packet having a selected, associated packet identifier are determined by traversing the graph and searching for graph-connected nodes for which the represented components stored log data with the selected packet identifier. Data indicating the components that processed the packet having the selected packet identifier is output.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
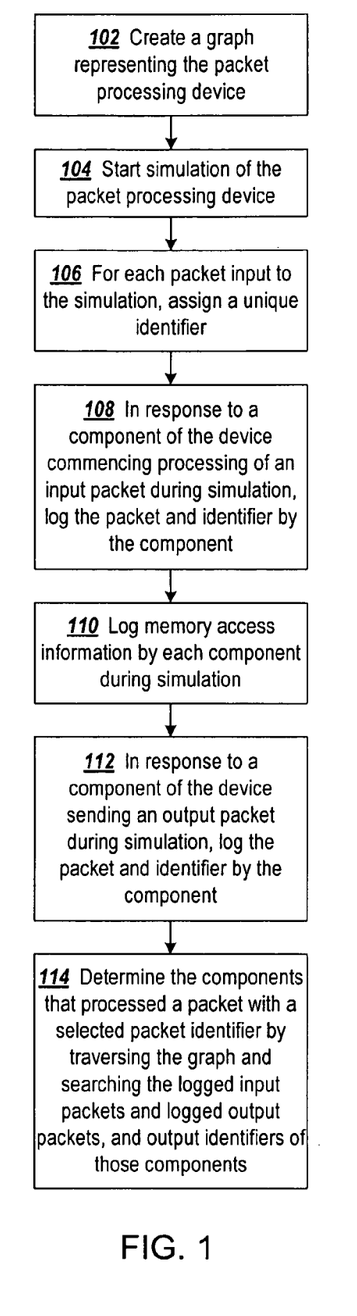
FIG. 1 is a flowchart of an example process for gathering packet processing information, in accordance with various embodiments of the invention.

FIG. 1 is a flowchart of an example process for gathering packet processing information, in accordance with various embodiments of the invention. The process generally entails representing the components of a device in a directed graph, logging data while simulating operation of the device, and using the graph in combination with the logged data to determine the paths through which individual packets flow through components of the device.

At step 102, a graph of the packet processing device is created. The source from which the graph is created may be a hardware description of the device in which components can be delineated by input and output ports. Various design analysis techniques known to those skilled in the art may be used to construct the graph. In one embodiment, the graph is a directed graph in which the nodes represent the components of the device and the arcs represent data connections between the components. That is, there is an arc directed from component a to component b if an output port of component a is connected to an input port of component b. The graph may be represented in the memory of a computing arrangement, for example.

The operation of the packet processing device is simulated at step 104. Those skilled in the art will recognize various simulation tools suitable for simulating operation of a packet processing device. The input data to the simulation are packets generally constructed to test operation of the device for a particular communications network protocol, for example TCP/IP. In one embodiment, the packets are represented by a textual instance of a packet data type in a high-level simulation. This instance is assigned a name which is preserved by the simulator. In a low-level simulation/execution environment, the identification is represented by a field in such a way that it does not affect the processing of a packet. The simulation may also take place directly on hardware, with the log data being directly generated by suitably connected probes and ultimately stored on the computer memory.

In one embodiment, the simulation model of the device is adapted to log selected input and/or output data by each of the components in the device. In one embodiment, the logged data reflects packets processed by the component. In another embodiment, the logged data further includes data that describes memory access by the components. Logging generally refers to storing data, which describes some transient processing state, in retentive storage so that the data may be later retrieved and analyzed.

The simulation model is further adapted to assign a unique packet identifier to each packet input to the device, as shown by step 106. Packets are assigned unique packet identifiers at the input ports at which packets are input to the device under consideration. In one embodiment, the packet identifier is a tuple that indicates the particular input port at which the packet is received and the identifier assigned to that instance of the packet data type.

The embodiments of the invention log incoming and/or outgoing packet data for the components. Another embodiment also logs data describing memory accesses. The logging of data by the simulated components may be to a centralized data logging facility in which the log data for all the components is stored in a single file, and log entries are stored in the file in the order in which the log entries are received. In another embodiment, each of the components stores its generated log data in a file to which only that component logs. Those skilled in the art will recognize that where each component has its own dedicated log file the component identifiers need not be stored in the log file, since each log file is associated with only one component.

At step 108, the simulation logs input packet data. More particularly, each component logs input data in the order in which that component commences processing of each packet. The logged input data includes all or portions of the data contained in the packet, for example, the header and payload, the associated packet identifier, and component identifier of the component.

In addition to logging packet data, another embodiment of the invention logs memory access data, as shown by step 110. The memory access data logged by a component can include for example, the component identifier, the accessed memory address, the operation (e.g., read or write), and the accessed data, or some portion thereof. The memory access log entries are made in order of each memory access. This information may be useful for subsequent analysis to determine the memory accesses that were a consequence of a particular packet.

At step 112, output packet data is logged. Each component, in response to each packet at each of its output ports, logs output data in order of departure of each packet from that component. The output data can include, for example, all or part of the packet data, the associated identifier, and component identifier of the component. As explained above, different embodiments of the invention may log only input packet data, only output packet data, or both input and output packet data.

The path along which a packet flowed through the components of the device is determined at step 114. Both the directed graph and the log file(s) are used to determine the path. In order to determine the path, a particular packet and source input port of the device are selected and the graph is traversed to nodes connected to the node corresponding to the source input port. For the component(s) corresponding to the connected node(s), the log file is checked to determine if that component logged any packet data (input, output, or both) with the packet identifier of the selected packet. If so, that component is designated as part of the path. If the component logged packet data for the selected packet, the process continues the graph traversal to connected nodes and searches for logged packet data as described. Data is output to indicate those components determined to be in the path of the packet flow. For example, the output data may be a list of components in path order, or a graphical display of the directed graph may be highlighted or colored to show the nodes and arcs for those components on the path.

Figure 2:
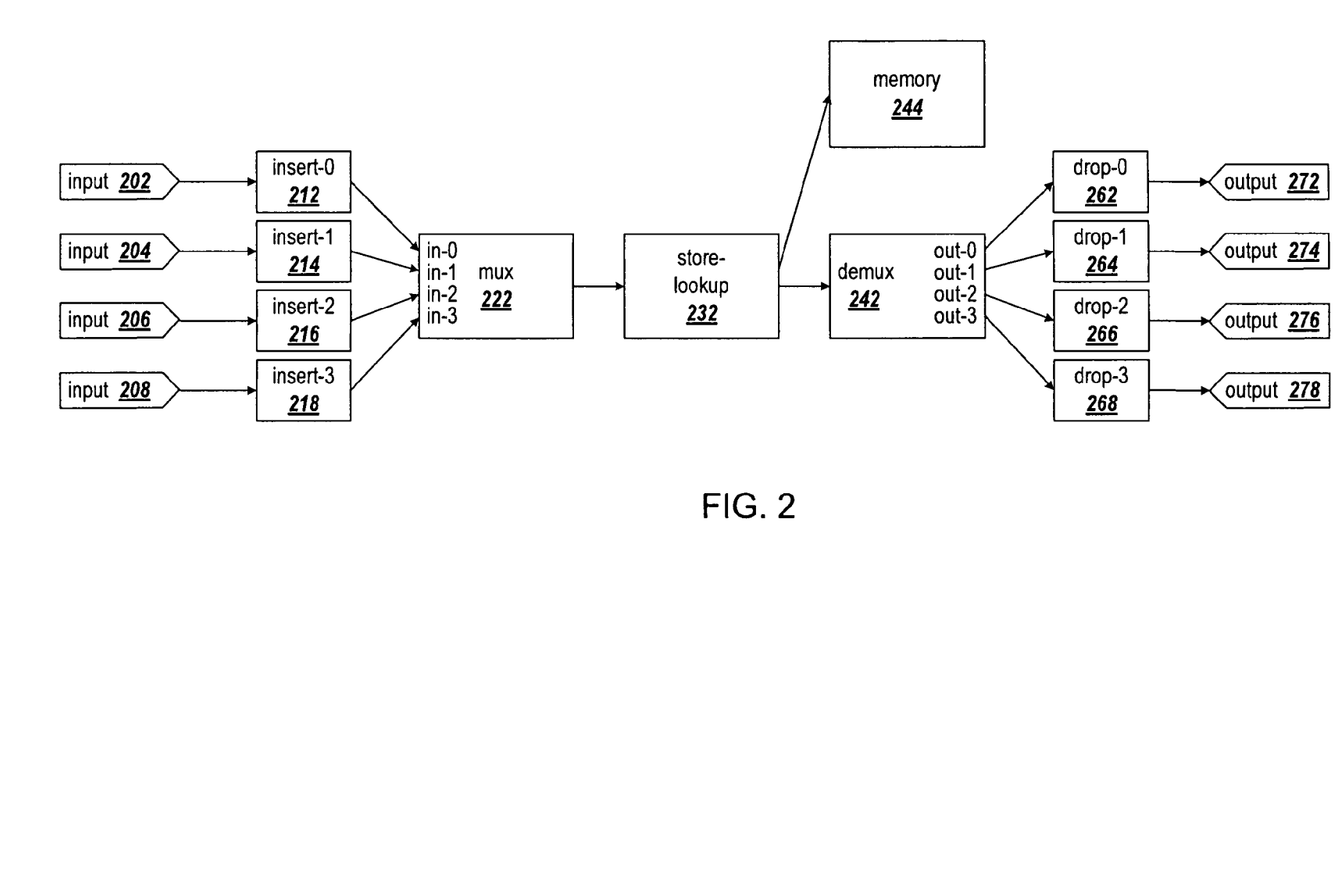
FIG. 2 is a directed graph of an example network packet processing device.

FIG. 2 is a directed graph of an example network packet processing device. Since each node in the graph corresponds to either a component of the device or an input/output port of the device, the nodes of the graph are referred to by the corresponding component name in this discussion. In addition, for purposes of illustration the logging of packet data by the simulated components is described with reference to the example graph. The arcs in the graph represent input port-to-output port connections between the components.

The input ports 202, 204, 206, and 208 correspond to the input ports of the device. It is in these simulated components that packet identifiers are assigned. Part of the packet identifier can be the name of the input port on which the packet was input. Thus, for example, a packet received on input port 206 has the name of input port 206 as part of the packet identifier.

Each of the device input ports 202, 204, 206, and 208 is connected to a respective one of insert components 212, 214, 216, and 218. For the purposes of the present invention, the particular functions of the insert components and other components in the device are irrelevant. The insert components have their respective output ports connected to respective input ports of the multiplexer component 222. The output port of the multiplexer is connected to the input port of the store-lookup component 232, which has two output ports. One output port of the store-lookup component is connected to de-multiplexer 242, and the other output port is connected to memory component 244. The de-multiplexer has output ports connected to respective drop components 262, 264, 266, and 268, and each of the drop components is connected to a respective one of the output ports 272, 274, 276, and 278 of the device.

As described above, in one embodiment input data is logged by a component when that component commences processing of a packet. For example, when insert component 216 begins processing a packet received via input port 206, insert component 216 logs input data. The logged input data includes all or part of the packet data, which in one embodiment includes the packet identifier. As previously explained, the packet identifier includes the name of input port 206 along with selected data from the packet to form a unique descriptor. For centralized logging, the logged input data further includes the component identifier for insert component 216, which may be used when determining the path of a particular packet.

Instead of, or in combination with, the logging of input packet data, output packet data may be logged. Continuing with the example, if insert component 216 outputs the packet on its output port, the component logs output data that describes the packet as described above. Each of the other components in the device similarly logs input and/or output packet data.

In addition to the logging of packet data during simulation, one embodiment of the invention has each component logging data that describes memory accesses by that component. For example, store-lookup component 232 is connected to memory 244. When the store-lookup component accesses the memory, that component logs data describing the memory access such as the type of operation, the address, and the accessed data. It will be recognized that some components do not access memory and logging of memory accesses is not applicable for those components.

Not only does the component-based logging of packet data support determining the paths by which packets flow through a device, but the logged packet data may be used to develop component-specific test suites. Such component-specific test suites may be useful, for example, for focusing testing on a particular component after that component has been modified from some previous design of the device. Thus, in such a scenario the previous design would have been simulated with a previously created set of input packets, and the components' log data from the simulation would have been saved. After the component has been modified, that component alone may be simulated using the log data for that component as extracted from the logged data produced from simulation of the previous design.

Figure 3:
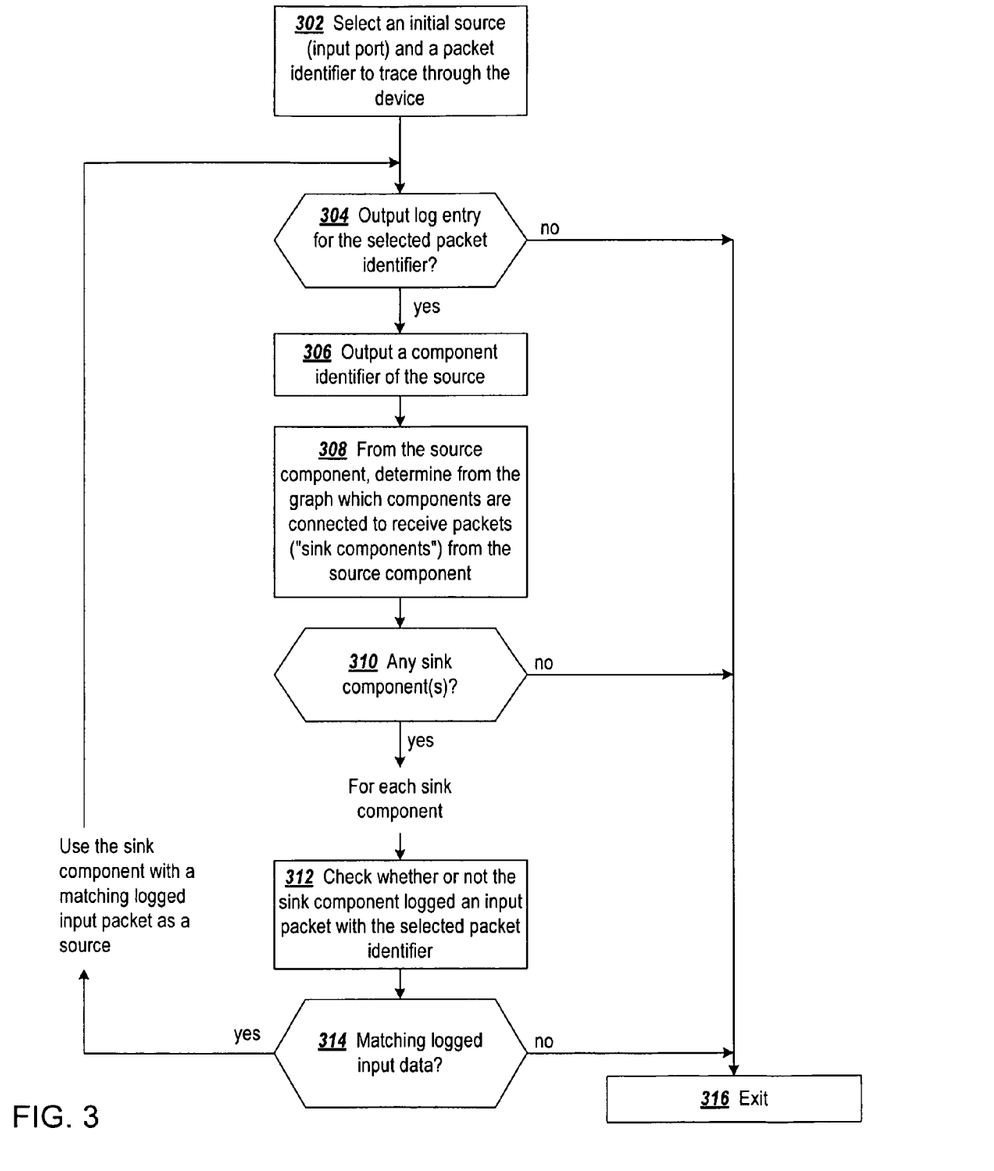
FIG. 3 is a flowchart of an example process for determining the components of a packet processing device that processed a selected packet, and thereby the path of the packet through the device, in accordance with various embodiments of the invention.

FIG. 3 is a flowchart of an example process for determining the components of a packet processing device that processed a selected packet, and thereby the path of the packet through the device, in accordance with various embodiments of the invention. The process generally traverses the directed graph that represents the packet processing device and, in conjunction, examines the log files of the components to determine which components processed a particular packet.

The embodiment illustrated in FIG. 3 is based on the logging of both input packet data and output packet data, and a component being on the path if it logged both input and output packet data. It will be appreciated, however, that in embodiments where only input or only output packet data is logged, the processing of FIG. 3 would be modified accordingly. For example, when only the input or output packet data is logged, a component may be determined to be on the path if that component logged packet data and any sink component connected to that component also logged packet data.

At step 302, an initial source component is selected along with a particular packet for which the path through the device is to be determined. The initial source is an input port of the device, which along with the packet data indicates the packet identifier. Decision step 304 determines whether or not the component logged output data for the selected packet, as indicated by the packet identifier, by reading data from the log file and searching for the packet identifier. Note that the device-level input port may be viewed as an "edge" component (which is not to be confused with an arc in the directed graph) of the device. For packets input to the device, the simulated device input port correspondingly logs output packet data, which signifies packets being provided by the edge component to another component in the device, for example, from input port 204 (an edge component) to insert component 214.

If there is logged output data by the source component for the selected packet, the process proceeds to step 306, which outputs a component identifier of the source component to indicate that the packet flowed through the source. The directed graph is then examined at step 308 to determine the component(s) connected to receive packets from the source component. These may be termed "sink" components. As described above in regards to FIG. 2, the directional arc that connects one node to another indicates a possible packet flow from the component represented by the one node to the component represented by the other node.

If there are any sink components found to be connected to the source (decision step 310), each of those sink components is individually processed beginning with step 312. At step 312, the process checks whether or not the sink component logged input data for the packet by searching for the packet identifier in the logged input data for that sink component. If matching logged input data is found, decision step 314 returns the process to decision step 304, with that sink component now being considered as a source component in the process.

If there is no logged output data for the selected packet identifier (decision step 304), or there are no sink components connected to the source component in process (decision step 310), the process exits at step 316 relative to the source component in process. Similarly, if there is no logged input data that matches the selected packet identifier for a sink component (decision step 314), the process exits. It will be recognized that in a device in which the representative directed graph has paths that diverge from a source component to multiple sink components, and further has paths from those sink components to additional components, the process may continue for one path in the graph even though an exit condition has been reached on another path.

Figure 4:
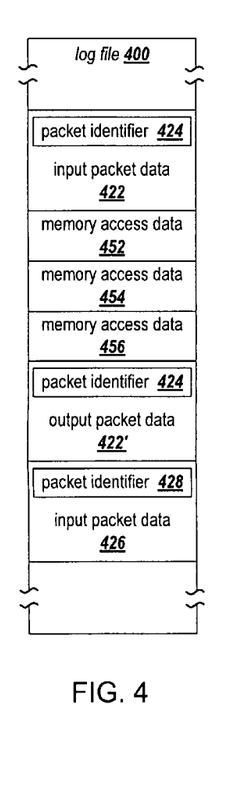
FIG. 4 shows an example log file in which memory access data is logged by a component along with logged input and output packet data.

FIG. 4 shows an example log file 400 in which memory access data is logged by a component along with logged input and output packet data. The example log file includes input packet data 422 having packet identifier 424, output packet data 422' having packet identifier 424, and input packet data 426 having packet identifier 428. The x and x' notation indicates that a packet x may be modified by the processing performed by a component. The notation does not imply that the data in a packet has necessarily changed. Thus, the logged output packet data 422' corresponds to the processing of the input packet which caused the logging of input packet data 422. In one embodiment, the packet identifier may be embedded with the packet data. In another embodiment, the packet identifier may precede the packet data in the log file.

The memory access data 452, 454, and 456 logged between input packet data 422 (having associated packet identifier 424) and input packet data 426 (having associated packet identifier 428) is known to be a consequence of processing the input packet indicated by input packet data 422, since there are no other input packets logged between input packet data 422 and input packet data 426.

The logged memory access data in combination with the logged packet input data permits a developer to determine which specific memory accesses were a consequence of processing a particular input packet. This ability may be useful, for example, when recreating an input packet sequence in which a problem surfaced in the form of a memory access error.

Figure 5:
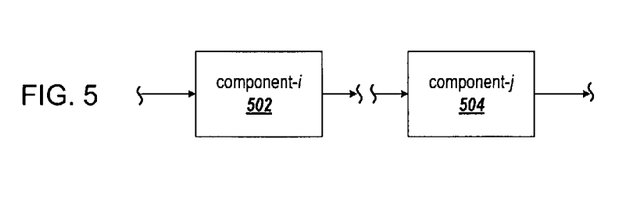
FIG. 5 shows a partial directed graph for a network device that includes a component-i and a component-j.

FIG. 5 shows a partial directed graph for a network device that includes a component-i 502 and a component-j 504. The example graph is presented to illustrate the relationship between component-i and component-j, the log records of which are compared in FIG. 6. The example component-i and component-j may be directly connected (e.g., as are components 222 and 232 in the example of FIG. 2) or indirectly coupled (e.g., as are components 218 and 242 in FIG. 2). The direct connection or indirect coupling means that a packet output by component-i may be input by component-j. The logging of packet data by the simulated components readily supports comparison of the packet states at different components along a packet processing path, for example, between component-i and component-j.

Figure 6:
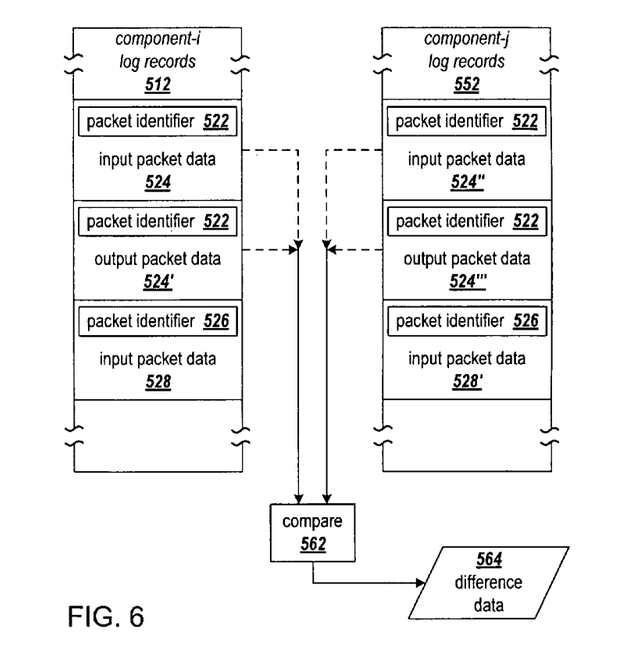
FIG. 6 shows the log records of component-i and the log records of component-j.

FIG. 6 shows the log records 512 of component-i and the log records 552 of component-j. The example log records for component-i include those for input packet data 524, output packet data 524', and input packet data 528. Input packet data 524 is that logged by component-i in processing the packet identified by packet identifier 522. Output packet data 524' is that logged after component-i has processed packet 524, including fields changed in the processing. The example log records also include input packet data 528, having packet identifier 526, for the next input packet to component-i.

The example log records for component-j include those for input packet data 524", output packet data 524"', and input packet data 528'. Input packet data 524" is that logged by component-j in processing the packet identified by packet identifier 522. Output packet data 524"' is that logged after component-j has processed packet 524", including fields changed in the processing. The example log records also include input packet data 528', having packet identifier 526, for the next input packet to component-j.

In the example, of FIG. 6, the packets with packet identifiers 522 and 526 are processed by both component-i and component-j. Using the packet identifiers, a developer may easily identify such packets and perform useful comparisons of the logged packet data. The input packet data or the output packet data logged by component-i for a particular packet, e.g., packet identifier 522, may be compared (block 562) to either input packet data or the output packet data logged by component-j for the same packet, as indicated by the same packet identifier 522. Any differences resulting from the comparison may be output as difference data 564. It may also be helpful to compare packets with the same identifier for a single component, e.g. packets 524 and 524'.

Figure 7:
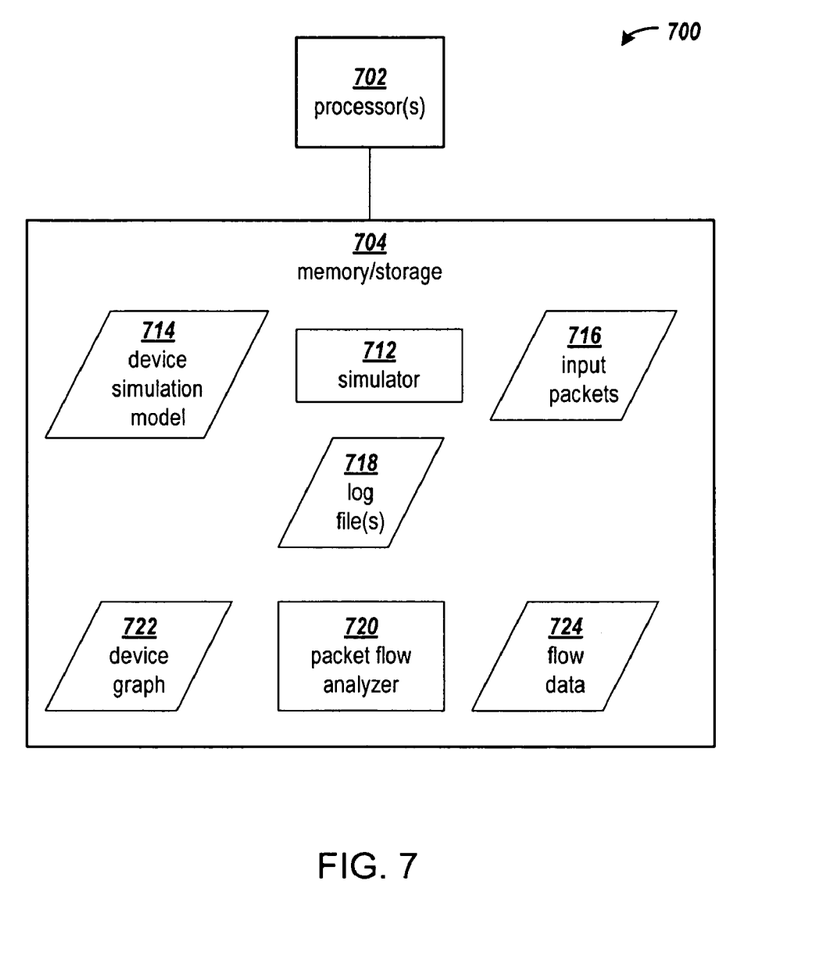
FIG. 7 is a block diagram of an example computing arrangement on which the processes described herein may be implemented.

FIG. 7 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Computing arrangement 700 includes one or more processors 702 coupled to a memory/storage arrangement 704. The architecture of the computing arrangement depends on implementation requirements, as would be recognized by those skilled in the art. The processor 702 may be one or more general purpose processors, or a combination of one or more general purpose processors and suitable co-processors, or one or more specialized processors (e.g., RISC, pipelined, etc.).

The memory/storage arrangement 704 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 702 executes the software stored in memory/storage arrangement 704, and reads data from and stores data to the memory/storage arrangement according to the processes described above. An operating system (not shown) manages the resources of the computing arrangement. The simulator module 712 executes on the processor arrangement 702 and simulates the device model 714 using input packets 716 as described as described above. Output from the simulation includes the log data file(s) 718, which may be stored in the memory/storage arrangement 704.

A packet flow analyzer module 720 also executes on the processor arrangement 702 and inputs the log files 718 and device graph 722 for determining the flow of selected packets through the components of the modeled device. The output from the packet flow analyzer is flow data 724, which includes identifiers of components that processed the selected packets and which may be stored in the memory/storage arrangement 704.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

The present invention is thought to be applicable to a variety of systems for devices that process network packets. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for gathering packet processing information in a packet processing system having a plurality of components, comprising:

representing, in a memory, a directed graph of the packet processing system, wherein nodes of the graph represent respective components, and arcs between the nodes represent packet connections between the components of the packet processing system;

in response to each network packet input to the system, establishing an associated, unique packet identifier for the network packet;

processing each input network packet by one or more components of the system;

storing, for each input network packet, respective log data by each of the one or more components of the system that processed the input network packet, the respective log data including data from the input network packet, and the associated identifier, the respective log data further including input log data in order of the component commencing processing of each packet and including memory access log data describing a memory access by a particular component in order of each memory access;

determining components of the plurality of components that processed a packet having a selected, associated packet identifier by traversing the graph and for each component represented by a node in the directed graph, searching the respective log data of the represented component for stored input log data with the selected packet identifier;

determining that a particular packet having the selected packet identifier caused a memory access by the particular component in response to the stored memory access log data being stored after stored input log data of the particular component for the particular packet and being stored before log input data of the particular component for a packet other than the particular packet; and outputting the memory access log data and data indicating the components that processed the packet having the selected packet identifier.

2. The method of claim 1, wherein:
the storing of log data includes, in response to each packet at each output port of each component, storing output log data by the component in order of departure of each packet from the component; and
the determining components includes traversing the graph and searching for each graph-connected nodes for which the represented components stored output log data with the selected packet identifier.

3. The method of claim 1, wherein:
the storing of log data includes,
in response to each packet at each output port of each component, storing output log data by the component in order of departure of each packet from the component; and
the determining components includes,
traversing the graph and searching for each graph-connected node for which the represented components stored input log data and output log data with the selected packet identifier.

4. The method of claim 1, wherein the traversing includes determining a second component for which to search for the selected packet identifier in the stored log data based on the graph having an arc from a node representing the particular component to a node representing to the second component.

5. The method of claim 1, further comprising:
comparing stored log data of a first component determined to be on the path to stored log data of a second component determined to be on the path; and
outputting data indicative of differences between data compared in the comparing step.

6. The method of claim 1, wherein the data indicating the components that processed the packet having the selected packet identifier indicates an order in which the components processed the packet.

7. The method of claim 1, wherein each packet identifier is a tuple that indicates a particular input port of the system at which the packet is received and a value indicative of an instance of a packet type.

8. The method of claim 1, wherein the storing of log data includes storing the log data from all components in centralized storage and including a component identifier in the respective log data for each input network packet.

9. The method of claim 1, wherein the storing of log data includes storing the log data from each components in a respective log file.

10. An article of manufacture, comprising:
a non-transitory processor-readable storage medium configured with instructions for gathering packet processing information in a simulated packet processing system having a plurality of components, the instructions when executed causing one or more processors to perform operations including:
representing, in a memory, a directed graph of the packet processing system, wherein nodes of the graph represent respective components, and arcs between the nodes represent packet connections between the components of the packet processing system;
in response to each network packet input to the system, establishing an associated, unique packet identifier for the network packet;
simulating processing each input network packet by one or more components of the system;
storing, for each input network packet, respective log data by each of the one or more components of the system that processed the input network packet, the respective log data including data from the input network packet, and the associated identifier, the respective log data further including input log data in order of the component commencing processing of each packet and including memory access log data describing a memory access by a particular component in order of each memory access;
determining components of the plurality of components that processed a packet having a selected, associated packet identifier by traversing the graph and for each component represented by a node in the directed graph, searching the respective log data of the represented component for stored input log data with the selected packet identifier;
determining that a particular packet having the selected packet identifier caused a memory access by the particular component in response to the stored memory access log data being stored after stored input log data of the particular component for the particular packet and being stored before log input data of the particular component for a packet other than the particular packet; and
outputting the memory access log data and data indicating the components that processed the packet having the selected packet identifier.

11. The article of manufacture of claim 10, wherein:
the operation of storing of log data includes, in response to each packet at each output port of each component, storing output log data by the component in order of departure of each packet from the component; and
the operation of determining component includes traversing the graph and searching for each graph-connected nodes for which the represented components stored output log data with the selected packet identifier.

12. The article of manufacture of claim 10, wherein:
the operation of storing of log data includes,
in response to each packet at each output port of each component, storing output log data by the component in order of departure of each packet from the component; and
the operation of determining component includes,
traversing the graph and searching for each graph-connected node for which the represented components stored input log data and output log data with the selected packet identifier.

13. The article of manufacture of claim 10, wherein the traversing includes determining a second component for which to search for the selected packet identifier in the stored log data based on the graph having an arc from a node representing the particular component to a node representing to the second component.

14. The article of manufacture of claim 10, the operations further comprising:
comparing stored log data of a first component determined to be on the path to stored log data of a second component determined to be on the path; and
outputting data indicative of differences between data compared in the comparing step.

15. The article of manufacture of claim 10, wherein the data indicating the components that processed the packet having the selected packet identifier indicates an order in which the components processed the packet.

16. The article of manufacture of claim 10, wherein each packet identifier is tuple that indicates a particular input port of the system at which the packet is received and a value indicative of an instance of a packet type.

* * * * *